(12) United States Patent
Dimenstein

(10) Patent No.: US 6,813,711 B1
(45) Date of Patent: Nov. 2, 2004

(54) DOWNLOADING FILES FROM APPROVED WEB SITE

(75) Inventor: Zachary David Dimenstein, Bronx, NY (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/477,413

(22) Filed: Jan. 4, 2000

Related U.S. Application Data

(60) Provisional application No. 60/114,958, filed on Jan. 5, 1999.

(51) Int. Cl.$^7$ ................................................. H04L 9/00
(52) U.S. Cl. ......................... 713/182; 707/10; 707/200; 707/204
(58) Field of Search ........................... 713/182; 705/51; 709/233, 4, 5; 707/3, 10, 200, 204, 4, 5

(56) References Cited

U.S. PATENT DOCUMENTS 6,434,535 B1 * 8/2002 Kupka et al. ................. 705/24
2001/0016836 A1 * 8/2001 Boccon-Gibod et al. ...... 705/51

OTHER PUBLICATIONS

North Communications, North Communications extends the Web to Touch screens, Feb. 3, 1997, M2Presswire.*

* cited by examiner

*Primary Examiner*—Kim Vu
*Assistant Examiner*—Paula Klimach
(74) *Attorney, Agent, or Firm*—Robert E. Bushnell, Esq.

(57) ABSTRACT

A method and apparatus for insuring that a digital storage device will only be able to download or play files that were obtained from sources deemed by the manufacturer of the device or by an overseeing organization to be acceptable. The files are downloaded in an unencrypted from and then encrypted prior to storage in a memory. The stored encrypted files are unencrypted prior to being transferred from the memory to the digital storage device.

22 Claims, 4 Drawing Sheets

DOWNLOADING FILES FROM APPROVED WEB SITE

CROSS-REFERENCE TO RELATED APPLICATION AND CLAIM OF PRIORITY

This application makes reference to, incorporates the same herein, and claims all benefits accruing under 35 U.S.C. §§119 from a provisional application for Approved Web Site MP3 Downloading earlier filed under 35 U.S.C. §111(b) in the United States Patent & Trademark Office on the Jan. 5, 1999 and there duly assigned Ser. No. 60/114,958.

BACKGROUND OF THE INVENTION

1. Field of the Invention

The present invention generally relates to a process and apparatus for ensuring that a digital storage device will only be able to download or play files that were obtained from sources deemed by the manufacturer of the device, or by an overseeing organization, to be acceptable, and, more particularly, to processes and devices able to ensure that the digital storage device does not download, play or display files that were obtained over the Internet from web sites that have not been pre-approved by either the manufacturer of the device or by an overseeing organization.

2. Description of the Related Art

With the growing popularity of using the Internet to transfer files in a digital format, there has been increasing concern over the need to protect the intellectual property rights of individuals and organizations to copyrighted materials such as books, music, movies and manuscripts. Once copyrighted materials have been made available in digital format, high quality illegal copies of copyrighted materials can be quickly and indiscriminately made available to others.

Several web sites currently make available for free distribution, unencrypted files of the contents of copyright materials such as books and music. Several of these web sites are maintained with the full consent of the lawful owners of the copyrighted material, because some copyright owners see this as a way to help promote and market their products. On the other hand, there are other web sites that make available copyrighted files without the consent of the rightful owners of the copyright. Generally, it is desirable to allow web sites to distribute lawfully available copies of both unencrypted and encrypted files over the Internet to digital devices while concurrently preventing these digital devices from being able to either play or download illegally available files. One technique that is currently used to address this problem uses encryption to allow only devices with the appropriate encryption key to decrypt a particular file; therefore, when an encrypted file is downloaded from a web site, only the devices for which the file was intended are able to decrypt that file.

Existing encryption techniques are appropriate in the situation where only legal sources have access to specific copyrighted material and precautions have been made to assure that whoever downloads that material can not subsequently distribute the material in an unencrypted format for use, by way of example, on another device able to display, reproduce or play the copyrighted material. I have noticed however, that existing encryption methods do not solve the problem of protecting copyrighted material from unlawful use or reproduction if the copyrighted material is already available in the hands of those who would make it available illegally; such is the case with music files, which are already widely distributed in digital format (i.e., compact discs, commonly known as "CD's") making it easy for someone to illegally distribute the musical content read from the disc over the Internet.

The fact that the digital content of a file, such as music, happens to be encrypted does not mean that the digital content has been made available with the consent of the rightful owners in the first place; therefore, encryption alone is not sufficient to address this problem of protecting copyrightable material.

SUMMARY OF THE INVENTION

It is therefore, one object of the present invention to provide improved processes and apparatus for distribution of files via the Internet.

It is another object to provide processes and apparatus to allow web sites to distribute lawfully available copies of both unencrypted and encrypted files over the Internet to digital devices, while concurrently preventing these digital devices from being able to either play or download files that are available illegally.

It is still another object to provide processes and apparatus that allow web sites to distribute legally available unencrypted and encrypted files over the Internet while simultaneously preventing digital devices from either playing or downloading illegally available files.

It is yet another object to provide a relatively efficient and foolproof solution that, when incorporated into processes and apparatus during the practice of the principles of the present invention, remedies the problem of protecting copyrightable material from unlawful use, reproduction and distribution by ensuring that a digital storage device will only be able to download or play those files that were obtained from approved sources.

Due to the open architecture of personal computers and the fact that personal computers are currently not covered under the Digital Audio Recording Devices And Media Act, 17 U.S.C. §1001, et seq., it may be difficult to restrict a personal computer from downloading illegally available material; however, it is still possible from both a technical and legal perspective to restrict non-personal computer digital devices (i.e., non-PC's) from downloading illegal material either directly from the Internet or from a personal computer. These and other objects may be attained by setting up an approved web site database with a personal computer that is equipped with software that encrypts only those files that are downloaded from web sites listed on that database. In turn, a digital storage device with a personal computer interface only downloads those files that have been appropriately encoded by the personal computer; alternatively, the digital storage device can be allowed to download any file but not be allowed to play or display any downloaded file. Similarly, non-PC digital devices with direct Internet connectivity would be able to only download, play and display those files downloaded from web sites on the Approved Website Database. The present invention may therefore, be practiced regardless of whether the files that are made available on a web site are either in an encrypted or in an unencrypted format.

In the practice of this invention with unencrypted files, digital devices are only able to download files that were made available in unencrypted format with the permission of the rightful owners of the copyrighted content of the material. The only action that is required by the managers of web sites will be to submit their web site to an industry committee as a legitimate source of files containing copyrighted material. This web site is in turn placed on the Approved Web Site Database and can be monitored for compliance with copyright protection laws. Those web sites that make available files without the consent of the rightful owners of the copyrighted material in those files would be denied listing on the Approved Website Database by the industry committee.

When practiced with an encrypted file during downloading, the practice of this invention ensures that web sites provide encrypted copyrighted material with the consent of the rightful owners of that material. The fact that a website happens to have the software necessary to encrypt the copyrighted material does not, by itself, necessarily mean that the web site is making those files available over the Internet legally in the first place. Proper maintenance of the Approved Web Site Database can serve as a way to ensure that digital devices are only able to download encrypted files that were made available with the consent of the rightful owners of the material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF TH INVENTION

Figure 1:
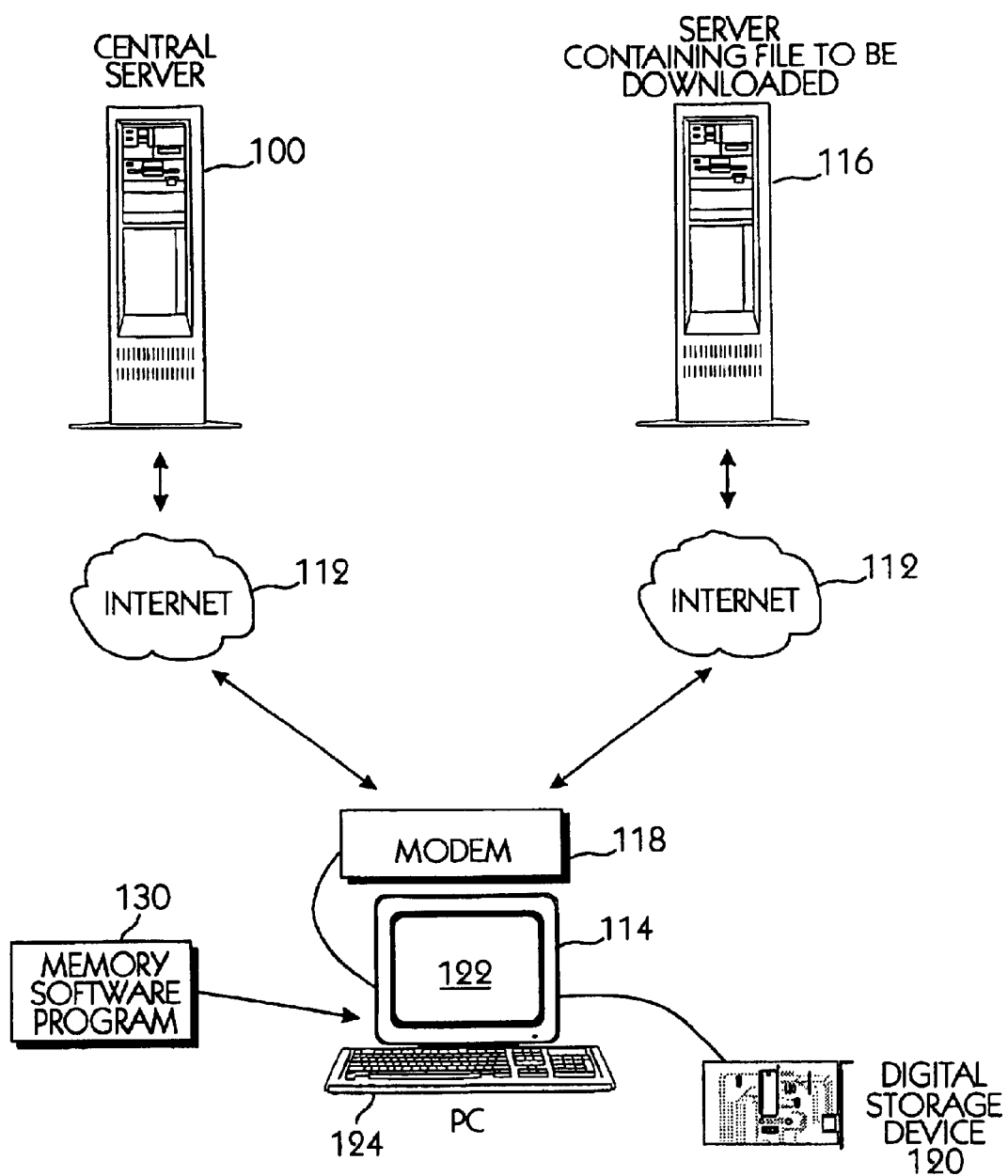
FIG. 1 is a diagram that illustrates the components of one system that may be used in the FIG. 2 is a flowchart of several of the steps that may be followed in order to launch a software program on a personal computer by using standard web browser.

Turning now to the drawings, FIG. 1 illustrates one system constructed as an Approved Web Site MP3 for downloading protectable material during the practice of the principles of the present invention. A central server 100 operationally coupled to transmit and receive communications on the Internet 112, contains an Approved Web Site Database, which is a list of web sites maintained by a personal computer 114 that is deemed to be one of a plurality of acceptable sources that are authorized to download via the modem 118 of computer 114, a file of a certain type from a server 116 to non-PC digital devices, such as digital storage device 120. Digital storage device 120 would, in turn, enable a consumer to use the downloaded material as, by way of example, listening to audio sounds and music and viewing video images that are contained within the downloaded file, with speakers or earphones (not shown) and the video monitor 122 of personal computer 114. Keyboard 124 enables the consumer to control personal computer 114 as well as to access the Internet 112 via modem 118.

Digital storage device 120 contains a PC interface (not separately shown) that permits control and data communication between computer 114 and device 120. Computer 114 loads from either an internal memory such as its hard disk, or from an external source, software that is adherent to the specifications described in the following paragraphs, to maintain copyright protection during and after the transfer of digital material to non-PC Internet enabled digital storage devices 120, as well as to digital storage devices that are able to download copyrightable material from the Internet 112 without the assistance of a PC 114.

Figure 2:
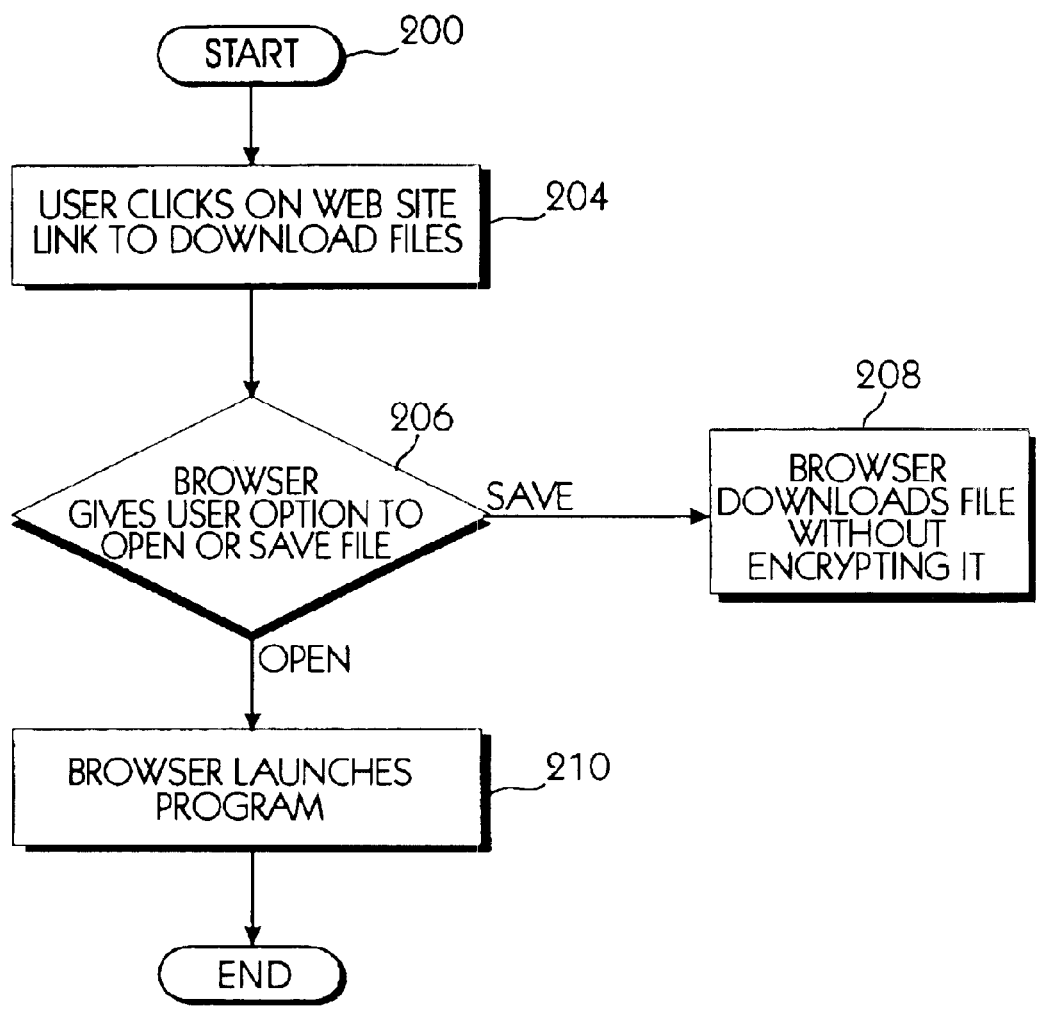

Turning now to FIG. 2, before a user begins to download selected files from Internet 112 onto a digital storage device 120 with a PC interface via a personal computer 114, the user first needs to load a software program (hereinafter sometimes referred to as the "Software Program" that is adherent to the specifications of this invention) from a memory 130 onto the operating system of computer 114. The Software Program loaded from memory 130 can contain either its own web browser program or the Software Program can be used in conjunction with another web browser already stored in computer 114. If the Software Program is to be used with another web browser, the Software Program can either be stored in a plug-in module that works with the web browser or the Software Program can configure the web browser so that the Software Program is the default executable program that is run whenever a user opens a file of the type that this system will be protecting (e.g., MP3).

As illustrated by FIG. 2, to implementing the latter approach, after starting the Software Program in step 200, in step 204 the user clicks a mouse selector button (not shown) or a keyboard designator to select a website link, and to select and to download specific files desired by the user. The Software Program gives the user an option in step 206 to either save or to open the selected downloaded file. Designation by the user of an election to save the selected file, triggers the Software Program to download the selected file from server 116 without first encrypting the selected file. Alternatively, designation by the user of an election to open the selected file triggers the Software Program to open the downloaded file and, in step 210, launch a program for playing the contents of the opened file. As illustrated in the FIG. 2, the Software Program may be implemented with either a plug-in or proprietary web browser, in much the same way. Accordingly, the Figures use a web browser as an illustrative example of an implementation of the principles of the present invention.

Figure 3:
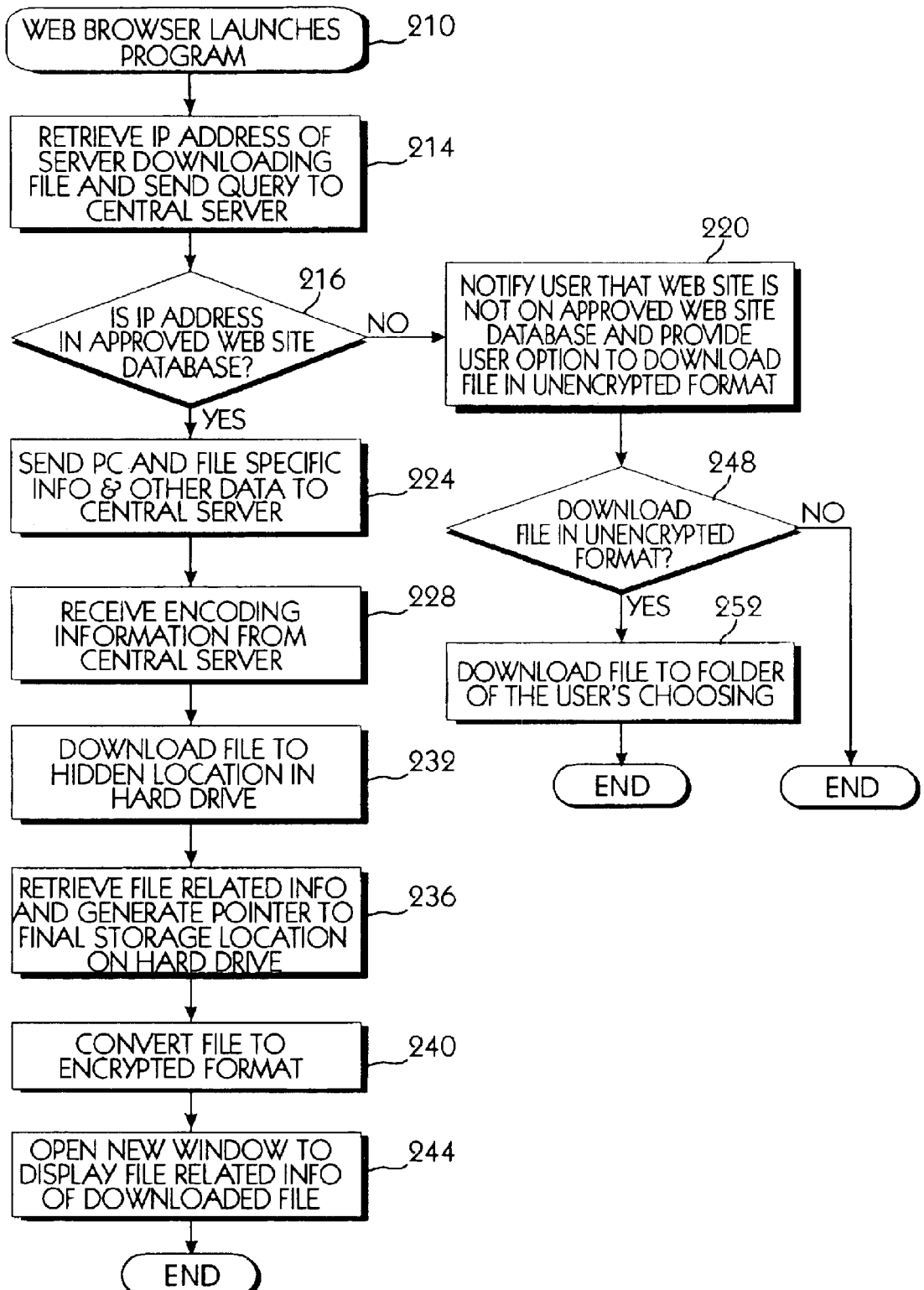
FIG. 3 is a flowchart of several of the steps that may be used in order to encrypt music files that have been downloaded from a web Approved Web Site Database.

FIGS. 2 and 3 illustrate the steps of the process for downloading a selected file from server 116. The web browser launches the program in step 210 when a user is using the web browser on personal computer 114 to visit a web site (e.g., a web site maintained by a server 116) that either accesses another server (not shown) or itself contains files that the user wishes to selectively download. In step 204, the user designates a file that he has selected by clicking (i.e., selecting via either a mouse selector button or a designated key of keyboard 124) on the file that the user wishes to download and then, in step 208, the browser prompts the user to indicate whether the user wishes to either open the selected file or to save the selected file. In order to be able to download or play the file on his digital storage device, the user must launch the Software Program during step 210, which, in this case, means that the user must choose the "open file" option in reply to the query from the browser during step 206.

When the Software Program is launched in step 210, in step 214 the Software Program retrieves the IP address of the server 116 that stores the file that has been selected by the user to be downloaded, and during step 216 the Software Program then sends a query to central server 100 to determine whether the IP address for server 116 is listed on the Approved Web Site Database. If the server 116 storing the file that was selected by the user to be downloaded is in the Approved Web Site Database maintained by central server 100, during step 332 the Software Program begins downloading the selected file from server 116.

Either before, during or after the selected file is downloaded to the hard drive (not separately shown) or other memory of computer 114, during step 224 central server 100 prompts the Software Program to send information that is specific to computer 114 and the selected file to central server 100, together with encryption information and other data, preferably over a secure connection. In response to the prompt, central server 100 stores and then uses this information, together with the other data that it receives from the Software Program running in computer 114, to assembly and transmit in step 228, unique encoding information back to the Software Program, so that the Software Program may, during step 240, use that encoding information to encrypt the file being downloaded, by using an encryption key unique to computer 114 and selected file being downloaded. Alternatively, the Software Program may encrypt the selected file and generate an encryption key without receiving the encoding information from the central server 100. The Software Program may either begin the process of encrypting the selected file as the selected file is being downloaded, or alternatively, the Software Program may wait until the selected file has been completely downloaded and, during step 232, stored in a hidden directory in the hard drive, or other memory of computer 114, and then, during step 240, begin the process of encrypting the selected file within computer 114. Once the selected file has been downloaded, during step 244 the Software Program opens a new window on the screen 122 of the monitor in order to display information such as, by way of example title, file name and the size of the file, that corresponds to the selected file.

When the inquiry to central server 100 initiated in step 216 determines that the web site (e.g., a web site accessed by server 116 or a web site maintained by computer 114) is not listed among the web sites on the Approved Web Site Database, during step 220 the Software Program provides the user with an option in step 248 that may be displayed on screen 122, to either download the selected file in an unencrypted format, or to not download the selected file. If the user selects to not receive the selected file in an unencrypted format, the Software Program terminates. If the user indicates a desire to receive the selected file in an unencrypted format, the Software Program downloads the selected file to a folder chosen by the user during step 252.

The user needs to use the Software Program to download the selected file from personal computer 114 to a digital storage device 120 that is compliant with the specifications of this protocol because digital storage device 120 is configured to only play or display files that have been appropriately encoded by the Software Program.

Figure 4:
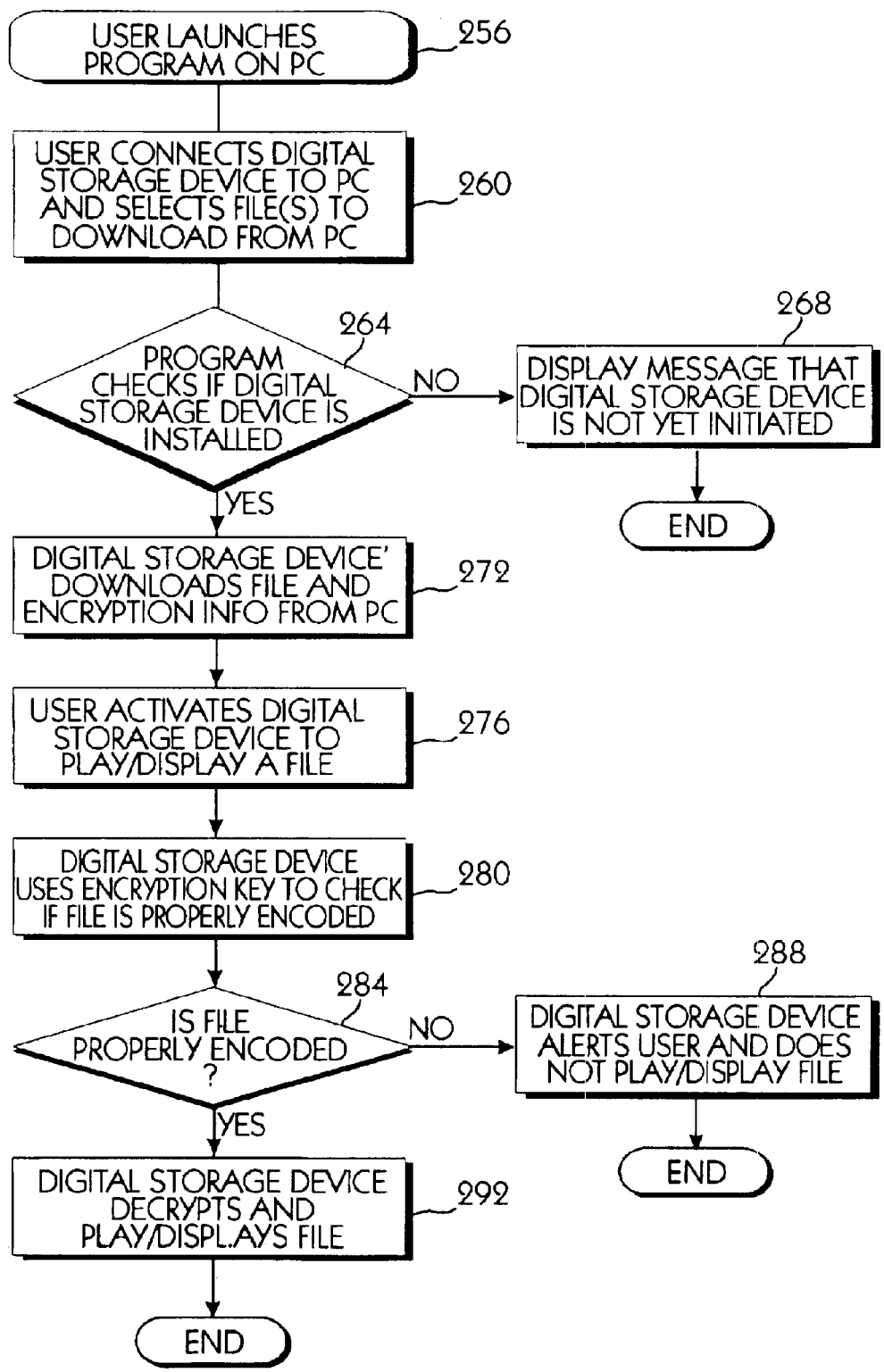
FIG. 4 is a flowchart of one method for a digital storage device to download, play and display encrypted files from a personal computer. practice of the principles of the present invention.

FIG. 4 illustrates the steps by which digital storage device 120 is able to download encrypted files from personal computer 114. In step 256, the user launches the program on personal computer 114. Then, in step 260, the user connects a digital storage device 120 to computer 114, and selects the particular desired file that the user wishes to download from computer 114. During step 264, the Software Program checks to determine whether the digital storage device 120 has been installed. If the determination establishes that device 120 has not been installed, the Program displays a message on screen 122 during step 268, stating that digital storage device 120 has not been yet initiated, and terminates the download algorithm. If the determination establishes that digital storage device 120 has been installed however, during step 272 digital storage device 120 downloads the selected file and the corresponding encryption information from computer 114.

Subsequently, the user may activate device 120 in order to either play or display the selected file during step 276. Once the user activates device 120 to either play or display the selected file, during step 280 device 120 employs the encryption key in order to check whether the file has been properly encoded. If during step 284 the determination is made that the selected file has been properly encoded, device 120 then decrypts and either plays or displays the file selected by the user during step 292. Alternatively however, if during step 284 a determination is made that the file has not been properly encoded, digital storage device 120 alerts the user and neither plays nor displays the selected file, but terminates the algorithm.

In order that digital storage devices 120 are able to play or display files that have been obtained from sources other than the Internet, the Software Program may be used by the user to encrypt those files as well. For example, in the case when it is determined to be appropriate to copy the contents of a compact disk onto the hard drive, or other memory of a personal computer 114 for later copying onto a digital audio storage device, for example, the Software Program may be used to appropriately encrypt the music tracks from the compact disk so that only that particular personal computer 114 and the digital storage devices 120 downloading the contents directly from that specific computer 114 will be able to play music from that specific compact disk. As an added measure of security, the Software Program may require that computer 114 be connected to the Internet and be able to access encryption coding information from the central server 100 so that the Software Program can use the encryption coding information from the central server to encode the selected file and to generate an encryption key.

The steps used to implement this process for Internet enabled digital storage devices are similar to those used for digital storage devices with personal computer interfaces, except that the Internet enabled digital storage devices do not require a personal computer in order to access files from the Internet. As such, the Software Program is loaded on the Internet enabled digital storage device instead of onto a personal computer. Additionally, when downloading a file of a certain type from the Internet, the enabled digital storage device may alternatively configured so that it will only be able to download files from web sites on the Approved Web Site Database, whereas the personal computer 114 is able to bypass the Soft download files from source. It is important to note however, that even when using a personal computer 114, a digital device 120 with a personal computer interface that is compliant with the specifications of this invention is not able to bypass these copyright protection mechanisms.

A digital content encryption apparatus deigned to restrict the sources from which a digital storage device will play or display digital content, with an Approved Web Site Database which contains a list of the web sites which are determined to be appropriate sources of files of a certain type for digital storage devices adherent to the specification described in this invention. A Central Server connected to the Internet on which the Approved Web Site Database is stored that performs the following functions: when prompted by the Software Program located on a PC or Internet enabled digital storage device, performs query search to determine whether a submitted IP address is on the Approved Web Site Database; when it is found that the IP address is on the Approved Web Site Database, generates encryption key/encoding information that is unique to the file being downloaded and the device to which it is being downloaded and transmits it to the Software Program; and transmits unique encryption key/encoding, information to the Software Program when the Software Program requests one for the purpose of encoding digital content that is being copied from a media storage peripheral device onto the device's own digital storage memory.

A Software Program located on a PC that performs the following functions: identifies the IP address from which a file is being downloaded; sends a query to the Central Server to determine whether an IP address is on the Approved Web Site Database; retrieves encryption key from Central Server when the IP address is on the Approved Web Site Database; encrypts the downloaded file on its own or using the encryption key provided by the Central Server 100; requests unique encryption code/key from Central Server and/or generates own encryption key for the purpose of encrypting digital content being copied from a PC peripheral onto the PC's hard drive; and initializes a Digital Storage Device so that the Digital Storage Device is able to download and play/display encrypted files downloaded from the PC.

A Digital Storage Device 120 with a PC interface that is adherent to this protocol, performs the following functions: connects to PC so that it can be initialized by the Software Program; allows the Software Program to retrieve information of files that it stores; allows the user to download files to it through the user interface of the PC Software Program; retrieves encryption key from the Software Program for files that it downloads; only plays or displays files that are appropriately encrypted; does not play or display files that are sent to it in unencrypted format; and does not provide other devices with access to its encryption key information.

The Software Program could also be located on an Internet enabled digital storage device 120 that performs the following functions: identifies the IP address from which a file is being downloaded; sends a query to the central server 100 to determine whether an IP address is on the Approved Web Site Database; retrieves encryption key/code information from central server 100 when the IP address is on the Approved Web Site Database; encrypts the downloaded file using the encryption key provided by the central server 100; only plays or displays files that are appropriately encrypted; does not play or display files that are sent to it in unencrypted format; and does not provide other devices with access to its encryption key information.

The foregoing paragraphs describe a workable solution that is relatively efficient and foolproof when incorporated into processes and apparatus during the practice of the principles of the present invention, remedy the problem of protecting copyrightable material from unlawful use, reproduction and distribution by ensuring that a digital storage device will only be able to download or play those files that were obtained from sources deemed either by the manufacturer of the device, or by an overseeing organization, to be acceptable. This ensures that these processes and digital storage devices do not download, play or display files that were obtained over the Internet from web sites that have not been pre-approved by either the manufacturer of the device or by an overseeing organization.

What is claimed is:

1. A method comprising:

receiving a command from a user to download at least one file from a selected web site, receiving a command from the user to either save the at least one file as is or open the at least one file;

retrieving an address of the selected web site in response to the command from the user to open the at least one file;

forwarding a query to at least one server to determine if the retrieved address is within an approved web site database;

notifying the user that the selected web site is not within the approved web site database upon a determination that the selected web site is not within the approved web site database and downloading the at least one file in an unencrypted format in response to a command from the user to download the at least one file in an unencrypted format to a selected folder of the user;

forwarding user information and information with regard to the at least one file to the at least one server upon a determination that the selected web site is within the approved web site database, and receiving encryption information from the at least one server in response thereto, the user downloading the at least one file in an unencrypted format from the selected web site and converting the at least one file to an encrypted format in accordance with the encryption information from the at least one server; and storing the at least one file in the encrypted format.

2. The method of claim 1, further comprising:

downloading and saving the at least one file as is in an unencrypted format upon a command from the user to save the at least one file as is.

3. The method of claim 1, further comprising:

receiving a command from the user to at least one of either play or display the at least one file stored in the encrypted format;

retrieving the at least one file stored in the encrypted format and decrypting the at least one file stored in the encrypted format with a previously stored encryption key in response to the user to at least one of either play or display the at least one file stored in the encrypted format; and playing or displaying to the user the now decrypted at least one file.

4. The method of claim 1, wherein the address of the selected web site comprises an Internet address of the selected web site.

5. The method of claim 2, further comprising transferring the at least one file as is in an unencrypted format to a digital storage device.

6. The method of claim 3, further comprising transferring the now decrypted at least one file to a digital storage device prior to playing or displaying to the user the now decrypted at least one file.

7. The method of claim 1, further comprising previously storing the approved web site database on the at least one server.

8. The method of claim 1, further comprising receiving a file from an external source and encrypting the received file from the external source into an encrypted format prior to storing the file.

9. The method of claim 8, further comprising:

receiving a command from the user to at least one of either play or display the at least one file stored in the-encrypted format;

retrieving the at least one file stored in the encrypted format and decrypting the at least one file stored in the encrypted format with a previously stored encryption key in response to the user to at least one of either play or display the at least one file stored in the encrypted format; and playing or displaying to the user the now decrypted at least one file.

10. The method of claim 9, further comprising transferring the now decrypted at least one file to a digital storage device prior to playing or displaying to the user the now decrypted at least one file.

11. An apparatus comprising:

at least one server;

a computer including:
   at least one user input device adapted to receive an input from a user;
   at least one of a display and an audio output device adapted to respectively
display or provide an audio output in response to data of a file; and
a memory adapted to store files;

a digital storage device adapted to be connected to the computer to receive files therefrom; and a network interface adapted to be connected to the computer to receive files from the at least one server via a network;

wherein, upon the computer receiving a command from the user via the at least one user input device to download at least one file from a selected web site and to either save the at least one file as is or open the at least one file, the computer retrieves the address of the selected web site in response to the command from the user to open the at least one file;

wherein, upon the computer retrieving the address, the computer forwards a query to the at least one server via the network and a network adapter to determine if the retrieved address is within an approved web site database;

wherein, the computer notifies the user that the selected web site is not within the approved web site database upon a determination that the selected web site is not within the approved web site database and downloads the at least one file in an unencrypted format in response to a command from the user to download the at least one file in an unencrypted format to a selected folder of the user;

wherein, the computer forwards user information and information with regard to the at least one file to the at least one server upon a determination that the selected web site is within the approved web site database, and receives encryption information from the at least one server in response thereto;

wherein, the computer downloads the at least one file in an unencrypted format from the selected web site and converts the at least one file to an encrypted format in accordance with the encryption information from the at least one server; and wherein the computer stores the at least one file in the encrypted format in the memory of the computer.

12. The apparatus of claim 11, wherein the computer downloads and saves the at least one file as is in an unencrypted format upon a command from the user to save the at least one file as is.

13. The apparatus of claim 11, wherein the computer:
upon receiving a command from the user via the at least one user input device to at least one of either play or display the at least one file stored in the memory in the encrypted format, retrieves the at least one file stored in the memory in the encrypted format and decrypts the at least one file stored in the encrypted format with a previously stored encryption key in response to the user to at least one of either play or display the at least one file stored in the memory in the encrypted format; and
plays or displays to the user the now decrypted at least one file.

14. The apparatus of claim 13, wherein the computer transfers the at least one stored now decrypted file from the memory to the digital storage device.

15. The apparatus of claim 12, wherein the computer transfers the unencrypted at least one stored file from the memory to the digital storage device.

16. The apparatus of claim 11, wherein the address of the selected web site comprises an Internet address of the selected web site.

17. The apparatus of claim 12, wherein the computer transfers the at least one file as is in an unencrypted format stored in the memory to a digital storage device.

18. The apparatus of claim 12, wherein the computer transfers the now decrypted at least one file stored in the memory to a digital storage device prior to playing or displaying to the user the now decrypted at least one file.

19. The apparatus of claim 11, wherein the at least one server stores the approved web site database therein.

20. The apparatus of claim 11, wherein the computer is adapted to receive a file from an external source and to encrypt the received file from the external source into an encrypted format prior to storing the file.

21. The apparatus of claim 20, wherein the computer:
receives a command from the user to at least one of either play or display the at least one file stored in the encrypted format;
retrieves the at least one file stored in the encrypted format and decrypt the at least one file stored in the encrypted format with a previously stored encryption key in response to the user to at least one of either play or display the at least one file stored in the encrypted format; and
plays or displays to the user the now decrypted at least one file.

22. The apparatus of claim 21, wherein the computer transfers the now decrypted at least one file stored in the memory to a digital storage device prior to playing or displaying to the user the now decrypted at least one file.

* * * * *